(12) United States Patent
Blackmond

(10) Patent No.: US 7,847,436 B2
(45) Date of Patent: Dec. 7, 2010

(54) MODULAR POWER SUPPLY

(76) Inventor: Edwin Arthur Blackmond, 142 N. Milpitas Blvd., PMB 162, Milpitas, CA (US) 95035

(*) Notice: Subject to any disclaimer, the term of this patent is extended or adjusted under 35 U.S.C. 154(b) by 55 days.

(21) Appl. No.: 12/250,791

(22) Filed: Oct. 14, 2008

(65) Prior Publication Data

US 2009/0102288 A1 Apr. 23, 2009

Related U.S. Application Data

(60) Provisional application No. 60/980,563, filed on Oct. 17, 2007.

(51) Int. Cl.
*H02J 7/36* (2006.01)
*H02J 4/00* (2006.01)
(52) U.S. Cl. ............................................... 307/71
(58) Field of Classification Search ............. 307/71
See application file for complete search history.

(56) References Cited

U.S. PATENT DOCUMENTS

| | | | |
|---|---|---|---|
| 3,867,643 A | | 2/1975 | Baker et al. |
| 4,117,364 A | * | 9/1978 | Baker .................... 318/810 |
| 4,528,458 A | * | 7/1985 | Nelson et al. ............ 307/64 |
| 4,673,826 A | * | 6/1987 | Masson ................... 307/66 |
| 4,680,690 A | * | 7/1987 | Dickerson ............... 363/43 |
| 5,243,269 A | * | 9/1993 | Katayama et al. ........ 320/126 |
| 5,422,558 A | * | 6/1995 | Stewart .................. 320/120 |
| 5,506,456 A | | 4/1996 | Yang |
| 5,656,915 A | | 8/1997 | Eaves |
| 5,761,058 A | * | 6/1998 | Kanda et al. ............. 363/60 |
| 5,991,179 A | * | 11/1999 | Schweighofer ........... 363/71 |
| 6,140,799 A | | 10/2000 | Thomasson |
| 6,150,795 A | * | 11/2000 | Kutkut et al. ............ 320/118 |
| RE37,126 E | * | 4/2001 | Peng et al. ............... 363/137 |
| 6,274,950 B1 | * | 8/2001 | Gottlieb et al. ........... 307/66 |
| 6,983,212 B2 | * | 1/2006 | Burns ..................... 702/63 |
| 7,075,306 B2 | * | 7/2006 | Emori et al. ............. 324/430 |

(Continued)

FOREIGN PATENT DOCUMENTS

DE 197 04 310 8/1997

(Continued)

OTHER PUBLICATIONS

L.M. Tolbert., et al. "Multilevel Inverters for Large Automotive Electric Drives", Presented at the All Electric Combat Vehicle Second International Conference, Jun. 8-12, 1997, vol. 2, pp. 209-214.

(Continued)

*Primary Examiner*—Jared Fureman
*Assistant Examiner*—Adi Amrany
(74) *Attorney, Agent, or Firm*—Wolff & Samson PC

(57) ABSTRACT

A power supply including a plurality of power supply modules and method of operating such a power supply includes monitoring the state of individual power supply modules. The power supply modules are monitored to prevent the operation of the modules outside a predetermined range. One power supply described herein includes a greater number of power supply modules than necessary to produce a desired output waveform. This allows a subset of power supply modules to be chosen to produce the desired output based on the state of each of the power supply modules as determined by monitoring.

26 Claims, 8 Drawing Sheets

U.S. PATENT DOCUMENTS

| | | | |
|---|---|---|---|
| 7,304,453 B2 * | 12/2007 | Eaves | 320/120 |
| 7,319,333 B2 * | 1/2008 | Emori et al. | 324/430 |
| 7,535,199 B2 * | 5/2009 | Kimura et al. | 320/121 |
| 7,553,583 B2 * | 6/2009 | Eaves | 429/61 |
| 2006/0043797 A1 * | 3/2006 | Hjort et al. | 307/46 |

FOREIGN PATENT DOCUMENTS

| | | |
|---|---|---|
| EP | 0 907 238 | 4/1999 |

OTHER PUBLICATIONS

Dr. Ketih Corzine, "Operation and Design of Multilevel Inverters", Developed for the Office of Naval Research, Dec. 2003, revised Jun. 2005.

PCT International Search Report corresponding to PCT Application No. PCT/US2008/011746 filed Oct. 15, 2008 (4 pages).

Written Opinion of the International Searching Authority corresponding to PCT Application No. PCT/US2008/011746 filed Oct. 15, 2008 (7 pages).

International Preliminary Report on Patentability corresponding to PCT Application No. PCT/US2008/011746 filed Oct. 15, 2008 (1 page).

* cited by examiner

FIG. 3

| TIME | 10A | 10B | 10C | 10D | 10E | 10F | 10G | 10H | TOTAL |
|---|---|---|---|---|---|---|---|---|---|
| 1 | 0 | 0 | 0 | 0 | 0 | 0 | 0 | 0 | 0V |
| 2 | V | 0 | 0 | 0 | 0 | 0 | 0 | 0 | 1V |
| 3 | V | V | 0 | 0 | 0 | 0 | 0 | 0 | 2V |
| 4 | V | V | V | 0 | 0 | 0 | 0 | 0 | 3V |
| 5 | V | V | V | V | 0 | 0 | 0 | 0 | 4V |
| 6 | V | V | V | V | V | 0 | 0 | 0 | 5V |
| 7 | V | V | V | V | V | 0 | 0 | 0 | 5V |
| 8 | V | V | V | V | V | V | 0 | 0 | 6V |
| 9 | V | V | V | V | V | V | V | 0 | 7V |
| 10 | V | V | V | V | V | V | V | 0 | 7V |
| 11 | V | V | V | V | V | V | V | 0 | 7V |
| 12 | V | V | V | V | V | V | V | V | 8V |
| 13 | V | V | V | V | V | V | V | V | 8V |
| 14 | 0 | V | V | V | V | V | V | V | 7V |
| 15 | 0 | V | V | V | V | V | V | V | 7V |
| 16 | 0 | V | V | V | V | V | V | V | 7V |
| 17 | 0 | 0 | V | V | V | V | V | V | 6V |
| 18 | 0 | 0 | 0 | V | V | V | V | V | 5V |
| 19 | 0 | 0 | 0 | V | V | V | V | V | 5V |
| 20 | 0 | 0 | 0 | 0 | V | V | V | V | 4V |
| 21 | 0 | 0 | 0 | 0 | 0 | V | V | V | 3V |
| 22 | 0 | 0 | 0 | 0 | 0 | 0 | V | V | 2V |
| 23 | 0 | 0 | 0 | 0 | 0 | 0 | 0 | V | 1V |
| 24 | 0 | 0 | 0 | 0 | 0 | 0 | 0 | 0 | 0V |
| 25 | 0 | 0 | 0 | 0 | 0 | 0 | 0 | 0 | 0V |
| 26 | -V | 0 | 0 | 0 | 0 | 0 | 0 | 0 | -1V |
| 27 | -V | -V | 0 | 0 | 0 | 0 | 0 | 0 | -2V |
| 28 | -V | -V | -V | 0 | 0 | 0 | 0 | 0 | -3V |
| 29 | -V | -V | -V | -V | 0 | 0 | 0 | 0 | -4V |
| 30 | -V | -V | -V | -V | -V | 0 | 0 | 0 | -5V |
| 31 | -V | -V | -V | -V | -V | 0 | 0 | 0 | -5V |
| 32 | -V | -V | -V | -V | -V | -V | 0 | 0 | -6V |
| 33 | -V | -V | -V | -V | -V | -V | -V | 0 | -7V |
| 34 | -V | -V | -V | -V | -V | -V | -V | 0 | -7V |
| 35 | -V | -V | -V | -V | -V | -V | -V | 0 | -7V |
| 36 | -V | -V | -V | -V | -V | -V | -V | -V | -8V |
| 37 | -V | -V | -V | -V | -V | -V | -V | -V | -8V |
| 38 | 0 | -V | -V | -V | -V | -V | -V | -V | -7V |
| 39 | 0 | -V | -V | -V | -V | -V | -V | -V | -7V |
| 40 | 0 | -V | -V | -V | -V | -V | -V | -V | -7V |
| 41 | 0 | 0 | -V | -V | -V | -V | -V | -V | -6V |
| 42 | 0 | 0 | 0 | -V | -V | -V | -V | -V | -5V |
| 43 | 0 | 0 | 0 | -V | -V | -V | -V | -V | -5V |
| 44 | 0 | 0 | 0 | 0 | -V | -V | -V | -V | -4V |
| 45 | 0 | 0 | 0 | 0 | 0 | -V | -V | -V | -3V |
| 46 | 0 | 0 | 0 | 0 | 0 | 0 | -V | -V | -2V |
| 47 | 0 | 0 | 0 | 0 | 0 | 0 | 0 | -V | -1V |
| 48 | 0 | 0 | 0 | 0 | 0 | 0 | 0 | 0 | 0V |

MODULAR POWER SUPPLY

This application claims the benefit of U.S. Provisional Application No. 60/980,563 filed Oct. 17, 2007, which is incorporated herein by reference.

BACKGROUND OF THE INVENTION

The present invention relates generally to power supplies, and more particularly to power supplies comprising a plurality of power supply modules.

Large amounts of electric energy can be stored in very dense packages because of advancements in battery technology. Innovation is continually increasing the density of energy storage devices. While necessary to achieve the volume and mass density of high capacity battery packs, this high energy density combined with battery construction materials presents considerable safety issues. Avoiding spectacular catastrophic events requires a battery management system to monitor the operating parameters of the battery cells and take actions to prevent these parameters from exceeding safety specifications.

Known battery management systems include some form of monitoring circuit to determine the status of the battery cells being managed. The actions taken by these systems in response to the status of the monitored parameters can be classified into several groups.

The simplest action is to disconnect the battery system whenever any cell in the system begins operating outside of its safety specifications. A major drawback to this approach occurs when all cells in the system are not perfectly matched and one cell approaches failure before the others. The failure of this cell will cause the device being powered by the battery pack to fail even if the combined pack is still capable of driving the load. The failure of this cell during charge will halt the charging of other cells and the capacity of the entire pack will be significantly depleted.

Another action is used to avoid premature discontinuation of the charging process in the event that one or more cells begin exceeding their recommended operating parameters before all the cells are charged. In this method, a shunt regulator is used to shunt charging current around the suspect cells while allowing the other cells to fully charge. On discharge, this method still requires the pack to be disconnected in the event of the failure of one cell despite the state of the other cells.

A more sophisticated approach attempts to keep all the cells in a battery pack in balance. This balancing method uses one or more isolated DC-DC convertors. The input terminals to each DC-DC converter are connected to the battery pack terminals while the output is connected through an electronic switching network to a cell that is lagging behind the others. In this way, the DC-DC converter assists the lagging cell allowing it to keep up with the others. A variation of this method employs a charge shuttling scheme that allows charge from other batteries in the pack to be shuttled from strong battery cells to weak battery cells. Since this approach requires the use of multiple DC-DC convertors, the cost of implementing this approach is significantly higher than other simpler approaches.

What is needed is a low-cost solution for preventing the operation of individual power sources outside of their safety specifications while maintaining a desired output.

BRIEF SUMMARY OF THE INVENTION

The present invention is related to a power supply comprised of multiple power supply modules and a method of operating a power supply comprised of multiple power supply modules. Specifically, in one illustrative embodiment, a method for operating a power supply having a plurality of power supply modules comprises monitoring each of the plurality of power supply modules and individually controlling the operation of each of the modules based on the monitoring.

In a second exemplary embodiment, a power supply is comprised of a plurality of power supply modules. In this embodiment, each of the power supply modules includes a power source, a switching module, a power source sensor module and a power supply module microcontroller. Each of the power supply modules is in communication with a power source microcontroller. The power source microcontroller monitors each of the power supply modules and controls the modules based on monitoring.

In yet another exemplary embodiment, a configurable power supply is comprised of a plurality of power supplies, each of which is comprised of a plurality of power supply modules. Each of the plurality of power supplies is in communication with a configurable power supply microcontroller. The configurable power supply microcontroller monitors each of the power supplies and controls the power supplies based on the monitoring.

These and other advantages of the invention will be apparent to those of ordinary skill in the art by reference to the following detailed description and the accompanying drawings.

BRIEF DESCRIPTION OF THE DRAWINGS

FIG. 3 is a table illustrating an exemplary operation of the power supply shown in FIG. 2A;

DETAILED DESCRIPTION

Figure 1A:
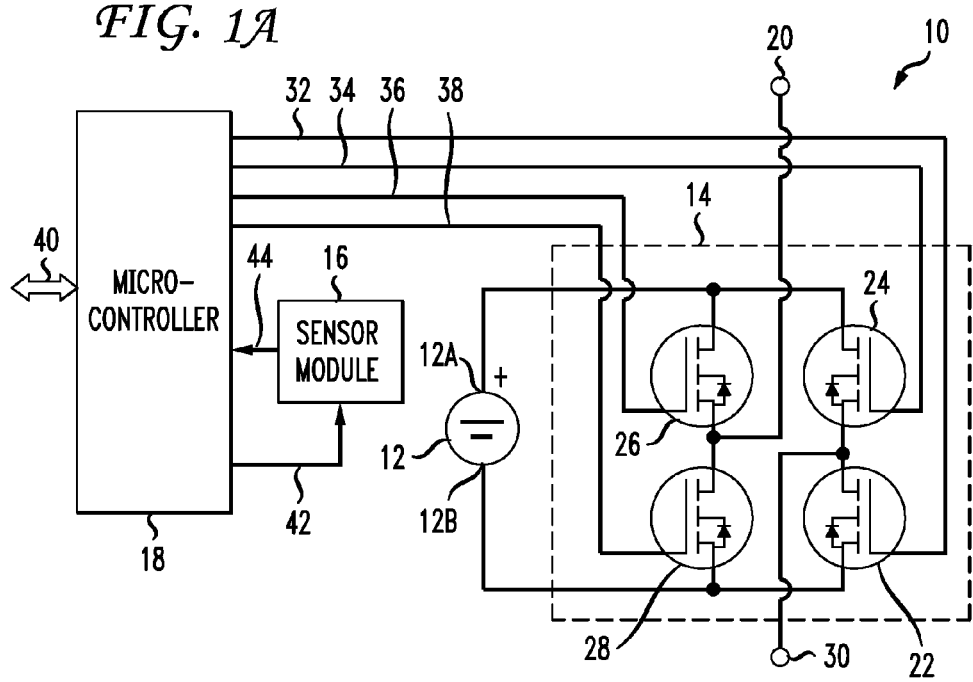
FIG. 1A shows a power supply module.

FIG. 1A shows a power supply module 10 including power source 12, switching module 14, power source sensor module 16, and power supply module microcontroller 18. Power source 12, in this embodiment, is a multi-cell battery such as a lead acid, nickel-cadmium, or lithium-ion type battery adapted to output a voltage of approximately twenty-two volts. In other embodiments, power source 12 may be a single cell battery or a different type of power source such as a solar cell, fuel cell, capacitor, or other device that outputs or produces power. Power source 12 has two terminals 12A and 12B electrically connected to switching module 14.

Switching module 14, in this embodiment, comprises four metal-oxide-semiconductor field-effect transistors (MOSFET) arranged in a full bridge configuration. In other embodiments, other configurations such as half-bridge and/or other types of switching devices such as Silicon-Controlled Rectifiers may be used. FIG. 1 depicts terminal 12A of power source 12 connected to the drains of MOSFETs 24 and 26. Terminal 12B of power source 12 is connected to the sources of MOSFETs 22 and 28. The drain of MOSFET 28 is connected to the source of MOSFET 26 and to terminal 20 of switching module 14. The drain of MOSFET 22 is connected to the source of MOSFET 24 and terminal 30 of switching module 14. The gates of MOSFETs 22, 24, 26, and 28 are electrically connected via signal lines 32, 34, 36, and 38 to power supply module microcontroller 18.

Power supply module microcontroller 18 is adapted to drive the gates of MOSFETs 22, 24, 26 and 28 via signal lines 32, 34, 36, and 38 respectively. Power supply module microcontroller 18 drives a signal line high to "turn on" a corresponding MOSFET meaning the MOSFET allows current to flow between the drain and source. Power supply module microcontroller 18 drives a signal line low to "turn off" a corresponding MOSFET meaning that the MOSFET prevents current flow between the drain and source. Power supply module microcontroller 18 is also adapted to transmit and receive signals from other devices, such as controllers external to power supply module 10, via communication and control interface 40. Power supply module microcontroller 18 also transmits and receives signals from power source sensor module 16 via signal lines 42 and 44 respectively.

Power source sensor module 16, contains one or more sensors for monitoring the parameters of power source 12. In the embodiment shown in FIG. 1A, power source 12 is a battery and power source sensor module 16 contains a voltage sensor, current sensor, and temperature sensor for sensing the state of power source 12. The types and number of sensors contained in power source sensor module 16 depend on the type of power source used as well as other factors such as the chemistry and design of the power source.

Figure 1B:
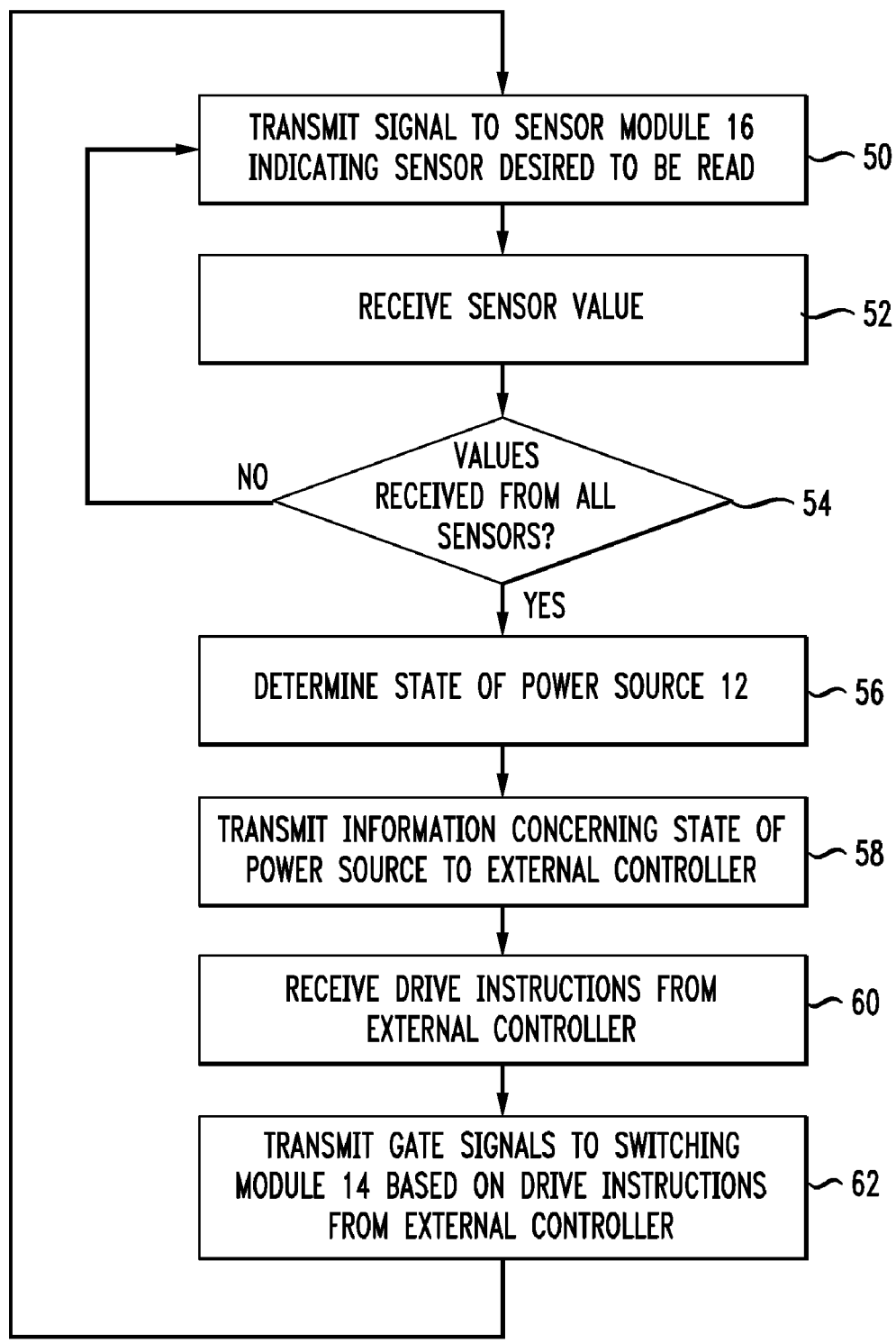
FIG. 1B is a flowchart illustrating the operation of the power supply microcontroller shown in FIG. 1A.

FIG. 1B depicts a flow chart illustrating the operation of power supply module microcontroller 18 of the embodiment of power supply module 10 shown in FIG. 1A. Power supply module microcontroller 18 transmits a request via signal line 42 requesting a value to be read from one of the sensors contained in power source sensor module 16 as shown in step 50 of FIG. 1B. In response to the request from power supply module microcontroller 18, power source sensor module 16 transmits the requested sensor value to power supply module microcontroller 18 via signal line 44. Power supply module microcontroller 18 then determines if all the required sensor values from sensors contained in power source sensor module 16 have been read as depicted in step 54. If the values from all sensors have not been received by power supply module microcontroller 18, then a signal is transmitted from power supply module microcontroller 18 to power source sensor module 16 via signal line 42 to request another sensor value to be read. The process is repeated until sensor values from all of the sensors in power source sensor module 16 have been read. Power supply module microcontroller 18 then proceeds to step 56 in which the state of power source 12 is determined using the acquired sensor values.

Figure 2A:
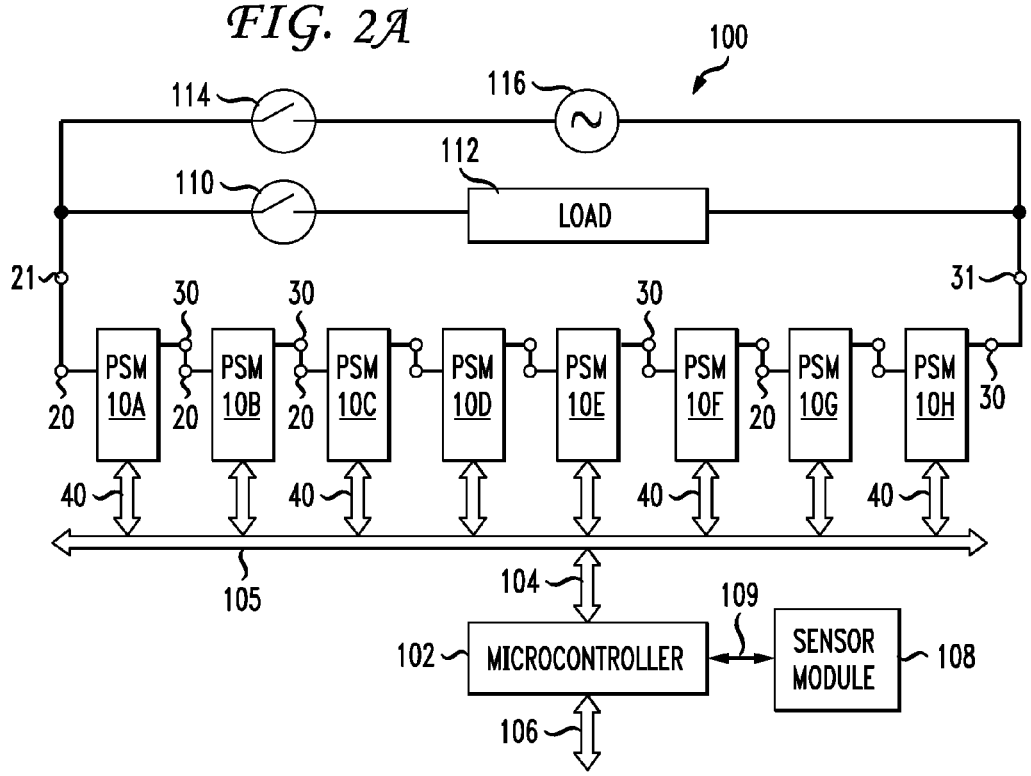
FIG. 2A shows a power supply comprising a plurality of power supply modules shown in FIG. 1A connected in series.

The state of power source 12 determined by power supply module microcontroller 18 as described above is transmitted to an external controller (such as power supply microcontroller 102 of FIG. 2A to be described below) as shown in step 58 of FIG. 1B. Note that microcontroller 18 shown in FIG. 1A is designated power supply module microcontroller 18 while microcontroller 102 shown in FIG. 2A is designated power supply microcontroller 102.

Power supply module microcontroller 18 receives drive instructions from the external controller as depicted in step 60. The drive instructions indicate how power supply module microcontroller 18 should transmit gate signals to switching module 14 over time to produce the desired output from power supply module 10. Power supply module microcontroller 18 transmits gate signals based on the drive instructions received from the external controller to switching module 14 via signal lines 32, 34, 36, and 38 as depicted in step 62.

Power supply module microcontroller 18 shown in FIG. 1A transmits gate signals via signal lines 32, 34, 36, and 38 to MOSFETs 22, 24, 26, and 28, respectively. MOSFETs 22, 24, 26, and 28 can be triggered in a variety of combinations to connect power source 12 terminals 12A and 12B to terminals 20 and 30 of switching module 14. For example, if MOSFETs 22 and 26 are turned on while MOSFETs 24 and 28 are turned off, terminal 12A of power source 12 is electrically connected to terminal 20 while terminal 12B of power source 12 is electrically connected to terminal 30. In this configuration and triggering combination, the voltage potential across terminals 20 and 30 is equal to power source voltage (referred to as +V). If MOSFETs 22 and 26 are turned off while MOSFETs 24 and 28 are turned on, terminal 12A of power source 12 is electrically connected to terminal 30 while terminal 12B of power supply 12 is electrically connected to terminal 20. In this configuration, the voltage potential across terminals 20 and 30 is equal to negative power source voltage (referred to as −V). MOSFETs 22 and 28 may be turned on in order to short terminals 20 and 30 together allowing current to flow through switching module 14 without affecting power source 12. It should be noted that turning on MOSFETS 26 and 28 or 22 and 24 at the same time would electrically connect power source 12 terminals 12A and 12B thereby shorting power source 12. MOSFET drive signals from power supply module microcontroller 18 maybe on or off for given time period or may alternatively be a modulated signal such as a pulse width modulated (PWM) signal.

In the embodiment shown in FIG. 1A and described in conjunction with the flow chart of FIG. 1B, power supply module microcontroller 18 polls power source sensor module 16 causing power source sensor module 16 to retrieve values from specific sensors one at a time. In other embodiments, power source sensor module 16 may continuously read sensor values and transmit all sensor values in response to a single request from power supply module microcontroller 18. In still other embodiments, power source sensor module 16 may periodically obtain sensor values and store them in a memory (not shown) contained in power source sensor module 16 which may then be accessed by power supply module microcontroller 18 to retrieve one or more sensor values.

The flow chart shown in FIG. 1B is an exemplary embodiment of the operation of power supply module microcontroller 18 of FIG. 1A. It should be understood that other methods of operation and sequence of steps may be used as well. For example, power supply module microcontroller 18 may periodically request sensor values from power source sensor module 16 in order to periodically determine the state of power source 12 and transmit the determined state information to an external controller only when certain predetermined criteria are met or predetermined conditions develop. Power supply module microcontroller 18 may also forward values obtained from power source sensor module 16 to external controllers periodically. In this type of embodiment, power supply module microcontroller 18 may then receive operating instructions from external controllers.

FIG. 2A depicts a power supply 100 configured as a single phase eight stage multilevel convertor connected to load 112 and alternating current power supply 116. Power supply 100 is comprised of eight power supply modules 10A-10H each of which, in this embodiment, is implemented using a power supply module 10 of FIG. 1A. Each of power supply modules 10A-10H is capable of communicating with power supply microcontroller 102 via power supply module communication and control interface 40, bus 105, and power supply communication and control interface 104. This communication capability allows power supply microcontroller 102 to monitor each of power supply modules 10A-10H. Power supply modules 10A-10H, in this embodiment, are connected in series with terminal 30 of power supply module 10A connected to terminal 20 of power supply module 10B, and terminal 30 of power supply module 10B connected to terminal 20 of power supply module 10C. Power supply modules 10C through 10H are similarly connected together. Terminal 20 of power supply module 10A is connected to terminal 21 which serves as a connection point to external devices such as load 112 and power supply 116. Terminal 30 of power supply module 10H is similarly connected to terminal 31.

Figure 6:
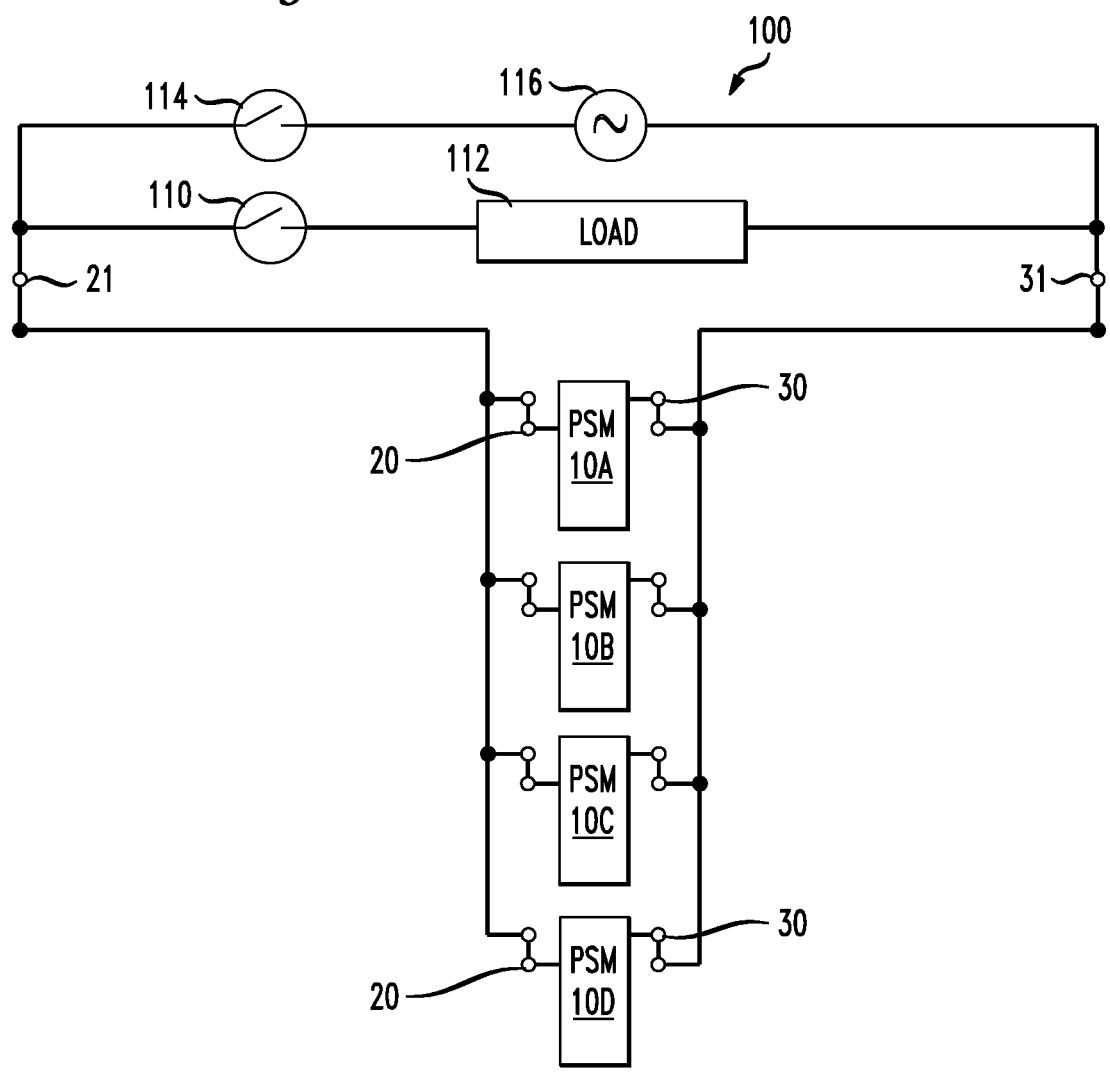
FIG. 6 shows a power supply comprising a plurality of power supply modules shown in FIG. 1A connected in parallel.
Figure 7:
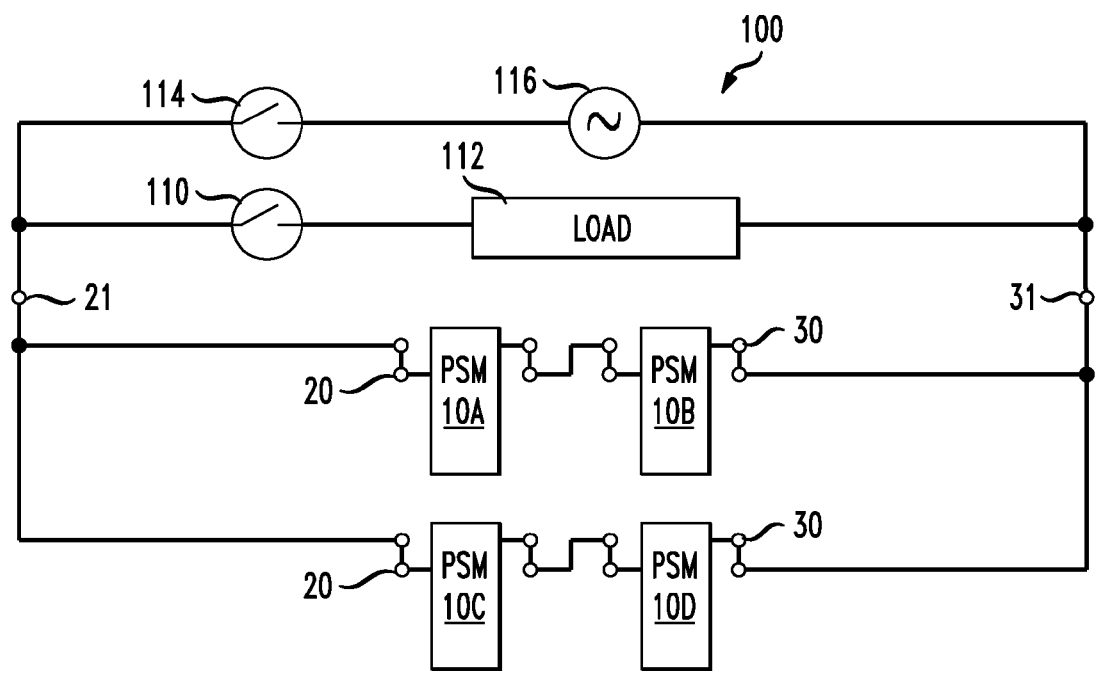
FIG. 7 shows a power supply comprising a plurality of power supply modules shown in FIG. 1A connected in series-parallel.

It should be noted that while, in the embodiment show in FIG. 2A, power supply modules 10A-10H are shown connected in series, other embodiments may have power supply modules connected in other configurations such as parallel (e.g., as depicted in FIG. 6) or series-parallel (e.g., as depicted in FIG. 7).

Load 112 and load switch 110 are shown connected in series across terminals 21 and 31. Load 112 is an object or device which is to be powered by power supply 100. Alternating current power supply 116 and power supply switch 114 are shown connected in series across terminals 21 and 31. Supply 116 and supply switch 114 are therefore connected in parallel with load 112 which is in series with load switch 110. Switches 110 and 114 are in communication with and controlled by power supply microcontroller 102. Power supply sensor module 108 communicates via signal line 109 with power supply microcontroller 102 and contains various sensors for measuring parameters of load 112 and power supply 116 such as voltage, frequency, and current.

In one advantageous embodiment, power supply microcontroller 102 may be adapted to perform the functions described in connection with power supply module microcontroller 18 of FIG. 1A. Power supply module microcontroller 18 is described above in connection with FIGS. 1A and 1B as adapted to read sensor values from sensor module 16 and transmit drive signals to switching module 14. Power supply microcontroller 102 shown in FIG. 2A may be adapted to read sensor values from each of sensor modules 16 and transmit drive signals to switching modules 14 of power supply modules 10A-10H thereby eliminating the need for power supply module microcontrollers 18 of power supply modules 10A-10H. In this advantageous embodiment, signal lines 32, 34, 36, 38, 42, and 44 may be connected to power supply microcontroller 102, for example, directly or through communication and control interface 40.

Power supply microcontroller 102 is capable of communication with an external controller via communication and control interface 106. Power supply microcontroller 102 is adapted to receive signals from an external controller to control its operation as well as the operation of power supply modules 10A-10H and switches 110 and 114. The external controller, in one embodiment, is a system level controller (not shown) which monitors and controls the system in which power supply 100 of FIG. 2A is installed. For example, power supply 100 may be installed in a system for powering a motor having a system controller for driving the motor at a desired speed under varying loads. In this example, the system controller may monitor the speed of the motor and command power supply microcontroller 102 to produce a desired waveform to be output from power supply module 100 and applied to the motor. The system controller may transmit signals to power supply microcontroller 102 requesting a different waveform be output from power supply module 100 to supply more or less power to the motor as required to maintain a desired speed under varying loads.

Figure 2B:
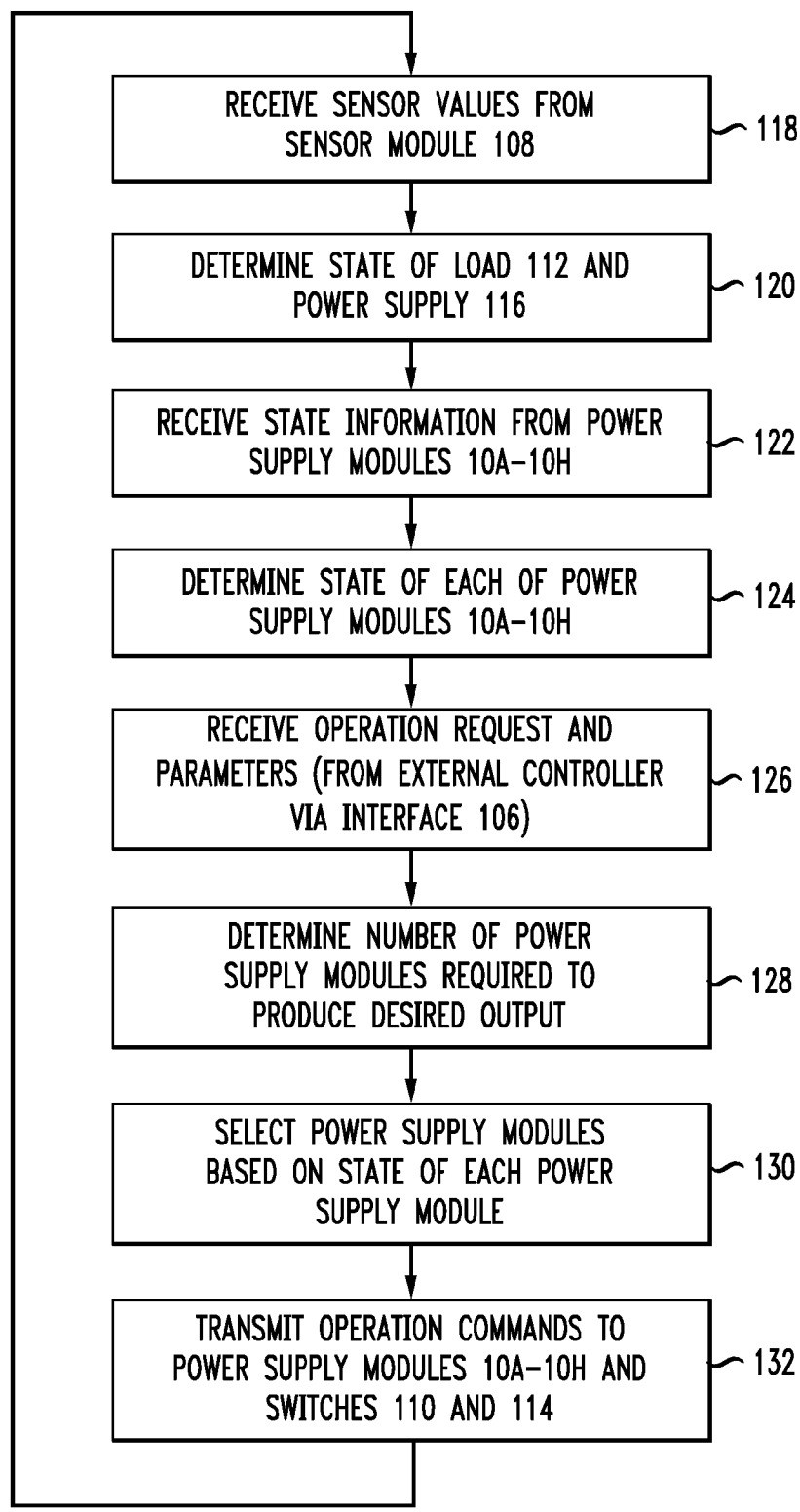
FIG. 2B is a flowchart illustrating the operation of the power supply microcontroller shown in FIG. 2A.

The flow chart shown in FIG. 2B is an exemplary embodiment of the operation of power supply microcontroller 102 of FIG. 2A. Power supply microcontroller 102 receives sensor values from power supply sensor module 108 as shown in step 118. Power supply sensor module 108 is comprised of various sensors depending on the intended application. For example, in this embodiment, power supply sensor module 108 includes sensors for detecting the voltage applied to and current through load 112 and sensors for detecting the voltage, current, and frequency of alternating current power supply 116. In this embodiment, power supply sensor module 108 continuously transmits sensor values to power supply microcontroller 102 without prompting or a request. Power supply microcontroller 102, in other embodiments, may periodically poll or intermittently request sensor values from power supply sensor module 108.

Power supply microcontroller 102 determines the state of load 112 and power supply 116 as indicated in step 120 based on the sensor values received from power supply sensor module 108. Power supply microcontroller 102 receives data related to the state of each of power supply modules 10A-10H as indicated in step 122. The data related to the state of each power supply module is transmitted from each of power supply module microcontrollers 18 (shown in FIG. 1A) through communication and control interfaces 40, bus 105, and communication and control interface 104 (all of which are shown in FIG. 2A). Power supply microcontroller 102 determines the state of each power supply module as indicated by step 124 based on information received from power supply module microcontroller 18 of each power supply module 10A-10H.

Power supply microcontroller 102 receives an operation request as shown in step 126. Operation requests are typically transmitted to power supply microcontroller 102 from an external controller, such as a system controller (not shown), via communication and control interface 106 (shown in FIG. 2A). Operation requests provide power supply microcontroller 102 with instructions pertaining to the desired operation of power supply 100. Step 126 indicates that power supply microcontroller 102 also receives operation parameters of the waveform to be output by power supply 100 such as the desired voltage, frequency, and current. In this exemplary embodiment, power supply microcontroller 102 is instructed to supply power to load 112. In other embodiments, microcontroller may be instructed to recharge power sources 12 of power supply modules 10A-10H using power supply 116.

Power supply microcontroller 102 then determines the number of power supply modules required to produce the desired output to be applied to devices attached across terminals 21 and 31 as shown in step 128. Power supply microcontroller 102 then selects a subset comprised of one or more of the plurality of power supply modules 10A-10H based on the state of each of modules 10A-10H as indicated by step 130. Power supply microcontroller 102 then activates each of the selected power supply modules in the subset by transmitting operation commands to power supply module microcontroller 18 of each of the selected power supply modules 10A-10H to produce the desired output across terminals 21 and 31. The power supply modules not selected to produce the desired output, in this embodiment, are commanded by power supply microcontroller 102 to turn on MOSFETs 22 and 28 thereby shorting terminals 20 and 30 and allowing current to flow through the switching modules 14 of these power supply modules. Step 132 indicates that power supply microcontroller 102 also transmits operation signals to switches 110 and 114, in this case, to close load switch 110 thereby connecting terminal 21 to load 112 and to keep power supply switch 114 open. Power supply microcontroller 102 then periodically monitors the output of the system in conjunction with the state of each of the power supply modules 10A-10H.

It should be noted that continuous monitoring of power supply modules 10A-10H by power supply microcontroller 102 allows for the deactivation of the selected subset of power supply modules and activation of a different subset based on the state of power supply modules 10A-10H.

Power supply modules 10A-10H are shown in FIG. 2A connected together in series which provides a maximum output voltage of the number of power supply modules times the voltage potential of each of power supply module across terminals 21 and 31. For example, if each of power supply modules 10A-10H are capable of outputting a voltage of one volt, then the maximum voltage that can be output is eight times one volt or eight volts. Switching module 14 of each power supply module 10A-10H may also be commanded to drive MOSFETs 22, 24, 26, and 28 to output the maximum voltage but with reverse polarity to terminals 20 and 30. This allows the maximum reverse polarity to be applied across terminals 21 and 31, in this example, negative eight volts.

In an exemplary embodiment, power supply 100 of FIG. 2A is configured as an eight stage multilevel converter to produce a waveform approximately equivalent to the North American standard of 120 Vrms 60 Hz residential alternating current power signal. In this embodiment, power sources 12 (shown in FIG. 1A) of each of power supply modules 10A-10H comprise 22 volt batteries and power supply microcontroller 102 is programmed to command power supply modules 10A-10H to command switching modules 14 (shown in FIG. 1A) to produce the aforementioned waveform.

FIG. 3 shows a table illustrating the potential across terminals 20 and 30 of each of power supply modules 10A-10H in columns "10A"-"10H" and the potential across terminals 21 and 31 shown in the "Total" column over time. Each time unit of the table is equal to approximately 347.2 microseconds. This time value, in this embodiment, is determined by dividing the time period for one cycle of the desired waveform, in this case 60 Hz equals 60 cycles per second or 16.67 milliseconds per cycle, by the number of time periods for each cycle of the desired waveform, in this example, 48.

During the first time period, designated by the "1" in the "Time" column of FIG. 3, each of the power supply module columns 10A-10H contains a "0". The "0" indicates that the potential between terminals 20 and 30 of switching module 14 for the particular power supply module is zero. During the "0" state, power supply module microcontroller 18 commands MOSFETs 22 and 28 of the particular power supply module to turn on thereby providing a conductive path from terminal 20, through MOSFETs 22 and 28 to terminal 30. In this state, terminals 20 and 30 are shorted together allowing current to flow through switching module 14 without affecting power source 12 of each power supply module. The "0V" in row 1 of the "Total" column indicates that there is zero potential difference across terminals 21 and 31 because the terminals are shorted together through PSMs 10A-10H.

The row designated "2" in the "Time" column contains a "V" in column "10A." The "V" indicates that power supply module microcontroller 18 of power supply module 10A is commanding MOSFETs 26 and 22 of switching module 14 to turn on. This causes the potential at terminal 12A of power source 12 to be applied through MOSFET 26 to terminal 20 of switching module 14 and the potential at terminal 12B of power source 12 to be applied through MOSFET 22 to terminal 30 of switching module 14. Columns 10B-10H each contain "0" in row 2 indicating that the terminals 20 and 30 of each of power supply modules 10B-10H are shorted allowing the voltage of power source 12 of PSM 10A to be applied across terminals 21 and 31. Thus, the voltage of power supply module 10A is applied across terminals 21 and 31 and is indicated by the "1V" in the "Total" column of row 2. Power supply microcontroller 102 commands power supply module microcontroller 18 of each of PSMs 10A-10H as indicated by rows 1-25 to produce a voltage across terminals 21 and 31 which varies over time from 0V to 8V as shown in rows 1-12 of the "Total" column and then from 8V to 0V as shown in rows 13-24 of the "Total" column.

Rows 25-36 of FIG. 3 illustrate the voltage across terminals 21 and 31 decreasing from 0V in row 25 to −8V in row 36. The "−V", as shown in row 26 of column "10A", indicates that power supply module microcontroller 18 of power supply module 10A is commanding MOSFETs 24 and 28 of switching module 14 to turn on. This causes the potential at terminal 12A of power source 12 to be applied through MOSFET 24 to terminal 30 of switching module 14 and the potential at terminal 12B of power source 12 to be applied through MOSFET 28 to terminal 20 of switching module 14. Columns 10B-10H each contain "0" in row 26 indicating that the terminals 20 and 30 of each of power supply modules 10B-10H are shorted allowing the voltage of power source 12 of power supply module 10A to be applied across terminals 21 and 31. The voltage of power supply module 10A applied across terminals 21 and 31 is indicated by the "−1V" in the "Total" column of row 2. Power supply microcontroller 102 commands power supply module microcontroller 18 of each of power supply modules 10A-10H as indicated by rows 26-48 to produce a voltage across terminals 20 and 30 of power supply modules 10A and 10H, respectively, which varies over time from −1V to −8V as shown in rows 26-36 and then from −8V to 0V as shown in rows 27-48. Power supply microcontroller 102 then repeatedly commands power supply modules 10A-10H to output voltage according to the table of FIG. 3 to produce a repeating sinusoidal waveform.

Figure 4:
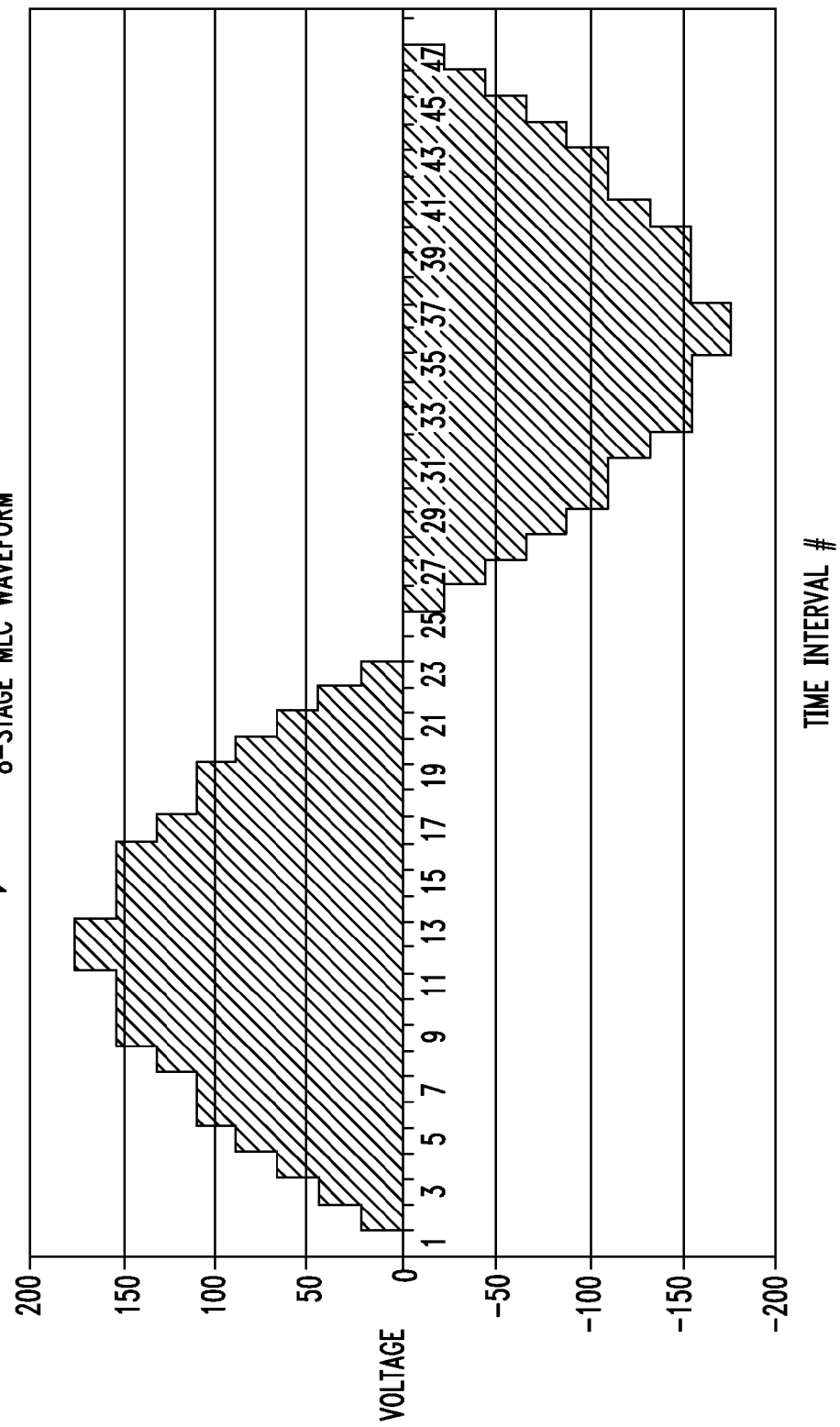
FIG. 4 is a graph illustrating an exemplary output from the power supply shown in FIG. 2A.

FIG. 4 shows graph 134 which depicts one cycle of a sinusoidal waveform applied across terminals 21 and 31 over 48 time intervals as described by the table of FIG. 3. As shown in the graph of FIG. 4, the applied waveform is roughly a sine wave having a peak-to-peak voltage of approximately three-hundred and fifty-two (352) volts and a period of 0.0166 seconds which is equivalent to the standard North American 120 Vrms 60 Hz residential alternating current power signal.

Power supply 100 of FIG. 2A can also be controlled to allow power supply 116 to charge power sources 12 of power supply modules 10A-10H. Power supply microcontroller 102 receives a signal from an external controller via communication and control interface 106 commanding power supply microcontroller 102 to charge power supply modules 10A-10H using power supplied by power source 116. Power supply microcontroller 102 receives the current parameters of power source 116 such as voltage, current, and frequency from power supply sensor module 108. Power supply microcontroller 102 then commands power supply modules 10A-10H to command switching modules 14 (shown in FIG. 1A) in a sequence to rectify voltage applied from power source 116 and charge power sources 12. Power supply microcontroller 102 then signals switch 114 to close and voltage from power supply 116 is applied across terminals 21 and 31 and, in turn, across power sources 12 of power supply modules 10A-10H. Power supply microcontroller 102 continues to monitor power supply 116 and adjust the operation of switching modules 14 of power supply modules 10A-10H to account for any changes in output of power supply 116. It should be noted that power supply microcontroller 102 can command both switches 110 and 114 to close allowing power supply 116 to both power load 112 and charge power supply modules 10A-10H.

In an advantageous embodiment, power supply 100 is comprised of plurality of power supply modules greater in number than that required to produce a desired output. In this embodiment, a subset of the plurality of power supply modules are selected to produce the desired output. Each of the plurality of power supply modules in the subset is chosen based on the state of the individual power supply modules. By selecting the power supply modules to be used to produce the desired output, power supply modules that are predicted to operate or are currently operating outside of safe parameters may be utilized less, or not at all, thereby keeping the power supply modules operating within predetermined safety parameters.

Figure 5:
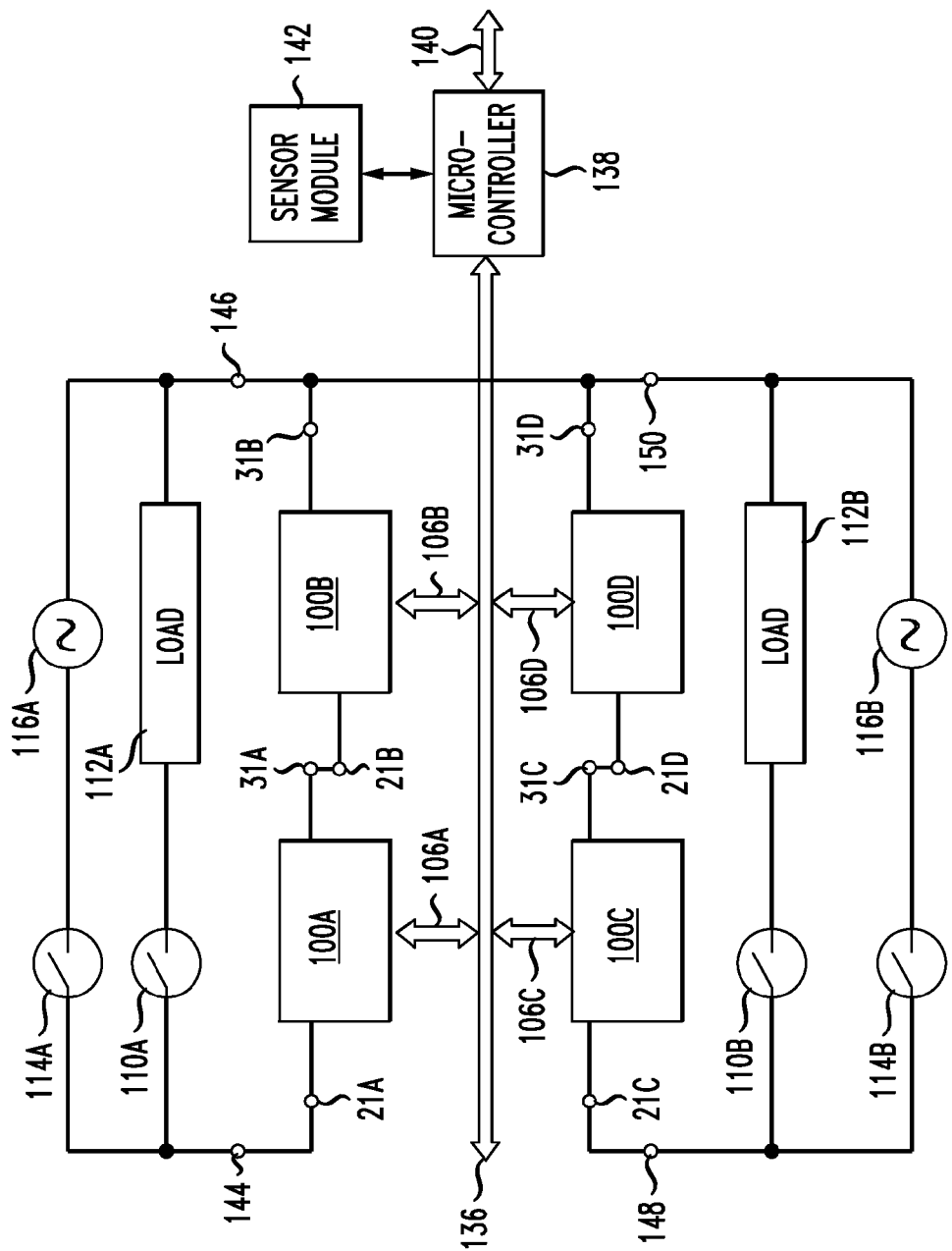
FIG. 5 shows a configurable power supply comprised of four of the power supplies shown in FIG. 2A.

In another advantageous embodiment, two or more of power supply 100 shown in FIG. 2A may be connected together and configured to output various waveforms. FIG. 5 depicts a configurable power supply, in this embodiment, a two-phase multilevel converter system constructed from four power supplies 100A-100D each of which, in this embodiment, is implemented using a power supply 100 of FIG. 2A. Power supplies 100A and 100B are connected in series with terminal 21B of power supply 100B connected to terminal 31A of power supply 100A. Terminals 21A and 31B are connected to terminals 144 and 146, respectively, which facilitate connection to external devices, in this case, switches 110A and 114A which in turn are connected to load 112A and power supply 116A respectively. Power supply modules 100C and 100D are similarly connected together in series with terminals 21C and 31D connected to terminals 148 and 150, respectively, which facilitate connection to external devices, in this case, switches 110B and 114B which in turn are connected to load 112B and power supply 116B respectively. Note that terminals 146 and 150 are connected together forming a common electrical node including terminals 31B and 31D.

System microcontroller 138 (also referred to as configurable power supply microcontroller 138) is connected to each of power supply modules 100A-100D via communication and control interfaces 106A-106D and communication and control bus 136. System microcontroller 138 is also adapted to communicate with external controllers via communication and control interface 140. System microcontroller 138 also communicates with sensor module 142 which includes one or more sensors for monitoring parameters of power supplies 116A and 116B as well as loads 112A and 112B. It should be noted that system microcontroller 138 may be adapted to perform the functions described in connection with power supply microcontrollers 102 of power supplies 100A-100D. In this case, system microcontroller 138 may communicate with power supply module microcontrollers 18 and power source sensor modules 16 directly or through communication and control interfaces 40, 104, and 106A-106D thereby eliminating the need for power supply microcontrollers 102 of power supplies 100A-100D. In addition, system microcontroller 138 may also be adapted to perform the functions described in connection with power supply module microcontrollers 18 of the power supply modules 10A-10H that each of power supplies 100A-100D are comprised of. In this case, signal lines 32, 34, 36, 38, 42, and 44 of each of power supply modules 10A-10H and signal lines 109 of sensor modules 108 of each of power supplies 100A-100D may be connected to system microcontroller 138, for example, directly or through communication and control interfaces 40, 104, and 106A-106D thereby eliminating the need for power supply module microcontrollers 18 of each of power supply modules 10A-10H and the power supply microcontrollers 102 of power supplies 100A-100D.

In the embodiment shown in FIG. 5, system microcontroller 138 is adapted to command power supplies 100A and 100B to output 120 Vrms at 60 Hz across terminals 144 and 146 and power supplies 100C and 100D to output 120 Vrms at 60 Hz across terminals 148 and 150 with one of the outputs phase shifted 180 degrees from the other. Thus, this embodiment can be used to derive 240 Vrms at 60 Hz which the voltage required to run household devices such as electric dryers. System microcontroller 138 can command power supply modules 100A-100D to allow charging of their internal power sources by power supplies 116A and 116B using the methods described above in connection with FIGS. 2A and 2B.

In other embodiments, two or more power supply modules 10 of FIG. 1 may be combined to form one or more power supplies similar to power supply 100 shown in FIG. 2A. These power supplies can then be connected together in various configurations to produce various waveforms having a desired voltage, frequency, and current flow. For example, a three phase waveform could be generated by connecting a single external microcontroller to three of power supplies 100 shown in FIG. 2A and commanding each of the power supplies to output a sinusoidal waveform phase shifted 120 degrees apart from one another.

In still other embodiments, multiple power supplies can be configured to produce a desired output using less than the total number of power supplies. For example, four power supplies, each similar to power supply 100 shown in FIG. 2A, could be configured to generate a three-phase waveform while the fourth is connected to and charged by a single-phase power supply. The power supplies could then be rotated to provide a three-phase power supply when only a single phase supply is available.

In one advantageous embodiment, a plurality of power supply modules connected in series may be commanded to connect one or more power supply modules in a polarity opposite the polarity of other power supply modules in the group. In this arrangement, the power supply modules can be kept in balance by charging weaker power supply modules while driving a load and discharging stronger power supply modules while charging.

Power supplies constructed in accordance with the above description may be packaged in a variety of ways for various applications. For example, a power supply configured as a single-phase multilevel converter adapted to generate a 120 Vrms 60 Hz waveform may be packaged in a portable case that can be carried. In an additional example, a power supply configured as a three-phase multilevel converter that generates a variable frequency three-phase waveform may be packaged into a case that can be mounted in a vehicle to drive the vehicle's three-phase traction motor. In yet another additional example, a power supply using solar cells as the power sources may be configured as a single-phase multilevel converter adapted to generate an output compatible with a utility power grid. A single-phase multilevel converter adapted in this manner allows the output of solar cells to be applied to a utility power grid. A power supply using solar cells as the power sources is typically adapted to monitor and control the output of the individual power supply modules in order to output the maximum power possible from the power supply. It should be noted this is different from the monitoring and control of power supply modules using power sources such as batteries, capacitors, or fuel cells which are typically adapted to produce a desired output and prevent the operation of the power source outside of its specified operating parameters as described above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operating a power supply having a plurality of power supply modules comprising the steps of:
   monitoring the state of each of the plurality of power supply modules;
   individually controlling the operation of each of the plurality of power supply modules based on said monitoring;
   transmitting drive instructions to each of the plurality of power supply modules;
   transmitting gate signals to a switching module of each of the plurality of power supply modules in response to the drive instructions, each of the switching modules, in response to particular gate signals, connecting a power source of a particular power supply module across a first terminal and a second terminal of a particular switching module, connecting the first terminal to the second terminal of the particular switching module shorting the terminals and allowing current to flow through the particular power supply module without affecting the power source of the particular power supply module, and disconnecting one of the terminals of the particular switching module thereby preventing current flow through the particular power supply module.

2. The method of claim 1 further comprising the step of activating a subset of the plurality of power supply modules to produce a desired output.

3. The method of claim 2 wherein the subset of the plurality of power supply modules activated is based on the state of each of the plurality of power supply modules.

4. The method of claim 2 further comprising the steps of:
   deactivating said subset of the plurality of power supply modules based on the state of each of the plurality of power supply modules; and
   activating a second subset of the plurality of power supply modules based on the state of each of the plurality of power supply modules.

5. The method of claim 1 further comprising the step of activating a subset of the plurality of power supply modules to charge the subset from an external power source connected to said power supply.

6. The method of claim 5 wherein the subset of the plurality of power supply modules activated is based on the state of each of the plurality of power supply modules.

7. The method of claim 5 wherein the step of activating a subset of the plurality of power supply modules further comprises balancing the subset of the plurality of power supply modules by setting the polarity of a first group of the subset of power supply modules opposite the polarity of a second group of the subset of power supply modules.

8. A power supply comprising:
   a plurality of power supply modules each comprising:
      a power source;
      a switching module electrically connected to the power source and comprising:
         a first terminal; and
         a second terminal;
      wherein the switching module is configured to, in response to particular gate signals, connect the power source across the terminals, connect the first terminal to the second terminal allowing current to flow through the power supply module without affecting the power source, and disconnect one of the terminals thereby preventing current flow through the power supply module;
      a power source sensor module configured to sense the state of the power source;
   a power supply microcontroller configured to monitor the state of each of the plurality of power supply modules based on information received from each of said power supply modules and control the operation of each of the plurality of power supply modules based on the states of the plurality of power supply modules.

9. The power supply of claim 8 wherein each of said plurality of power supply modules further comprises a power supply module microcontroller in communication with the switching module and the power source sensor module.

10. The power supply of claim 8 wherein said plurality of power supply modules are connected in series.

11. The power supply of claim 8 wherein said plurality of power supply modules are connected in parallel.

12. The power supply of claim 8 wherein said plurality of power supply modules are connected in series-parallel.

13. The power supply of claim 8 further comprising a load switch adapted to connect a load to the plurality of power supply modules.

14. The power supply of claim 8 further comprising a power source switch adapted to connect a power source to the plurality of power supply modules.

15. The power supply of claim 8 further comprising a second sensor module adapted to sense at least one parameter of at least one of a power source and a load.

16. The power supply of claim 8 wherein the power source of at least one of said power supply modules comprises at least one of a battery comprising at least one battery cell, a solar panel comprised of at least one solar cell, a capacitor, and a fuel cell.

17. A configurable power supply comprising:
   a plurality of power supplies each comprising:
      a plurality of power supply modules each comprising:
         a power source;
         a switching module electrically connected to the power source and comprising:
            a first terminal; and
            a second terminal;
         wherein the switching module is configured to, in response to particular gate signals, connect the power source across the terminals, connect the first terminal to the second terminal allowing current to flow through the power supply module without affecting the power source, and disconnect one of the terminals thereby preventing current flow through the power supply module;

a power source sensor module configured to sense the state of the power source; and a configurable power supply microcontroller configured to monitor the state of each of the plurality of power supplies based on information received from each of the plurality of power supplies and control the operation of each of the plurality of power supplies based on the state of each of the plurality of power supplies.

18. The configurable power supply of claim 17 wherein each of said plurality of power supply modules further comprises a power supply module microcontroller in communication with the switching module and the power source sensor module.

19. The configurable power supply of claim 17 wherein each of said plurality of power supplies further comprises a power supply microcontroller configured to monitor the state of each of the plurality of power supply modules based on information received from each of said power supply modules and control the operation of each of the plurality of power supply modules based on the states of the plurality of power supply modules.

20. The configurable power supply of claim 17 wherein each of said plurality of power supplies further comprises a load switch adapted to connect a load to each of said plurality of power supplies.

21. The configurable power supply of claim 17 wherein each of said plurality of power supplies further comprises a power source switch adapted to connect a power source to each of said plurality of power supplies.

22. The configurable power supply of claim 17 further comprising a second sensor module adapted to sense at least one parameter of at least one of a power source and a load.

23. The configurable power supply of claim 17 wherein the power source of at least one of said power supply modules comprises at least one of a battery comprising at least one battery cell, a solar panel comprised of at least one solar cell, a capacitor, and a fuel cell.

24. The configurable power supply of claim 17 wherein the plurality of power supplies are connected in series.

25. The configurable power supply of claim 17 wherein the plurality of power supplies are connected in parallel.

26. The configurable power supply of claim 17 wherein the plurality of power supplies are connected in series-parallel.

* * * * *